(No Model.) 2 Sheets—Sheet 1.

E. W. ROSS.
STRAW CUTTER.

No. 295,947. Patented Apr. 1, 1884.

WITNESSES
F. L. Ourand
Rex Smith

INVENTOR
E. W. Ross
by Sell Smith
Attorney

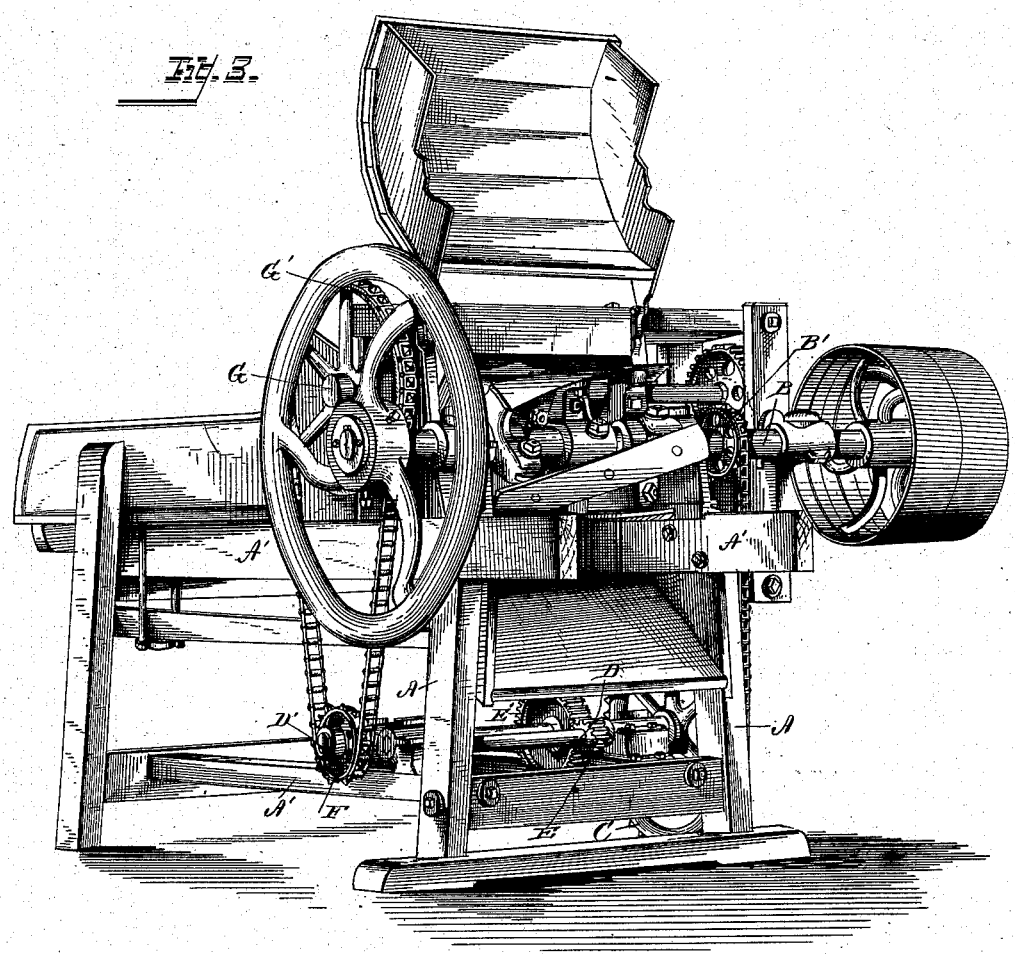

United States Patent Office.

ELMORE W. ROSS, OF FULTON, NEW YORK.

STRAW-CUTTER.

SPECIFICATION forming part of Letters Patent No. 295,947, dated April 1, 1884.

Application filed March 1, 1883. (No model.)

*To all whom it may concern:*

Be it known that I, ELMORE W. ROSS, of Fulton, county of Oswego, and State of New York, have invented a new and useful Improvement in Straw-Cutters, of which the following is a full, clear, and exact description, reference being had to the accompanying drawings, making part of this specification.

My invention relates to the manner of gearing back to or actuating the feed-roller shaft from the main driving or cutting shaft of the machine; and it consists in an arrangement of interposed parallel shafts, in combination with sprocket or band wheels and chains or belts connecting the driving-shaft with the feed-roller for actuating the latter, as hereinafter explained.

The machine in its organization or general construction and arrangement of parts, aside from the mechanism for actuating the feed-rollers referred to, may be similar to others now in use, and need not therefore be described in detail further than is necessary to an understanding of my present improvement.

Figure 1:
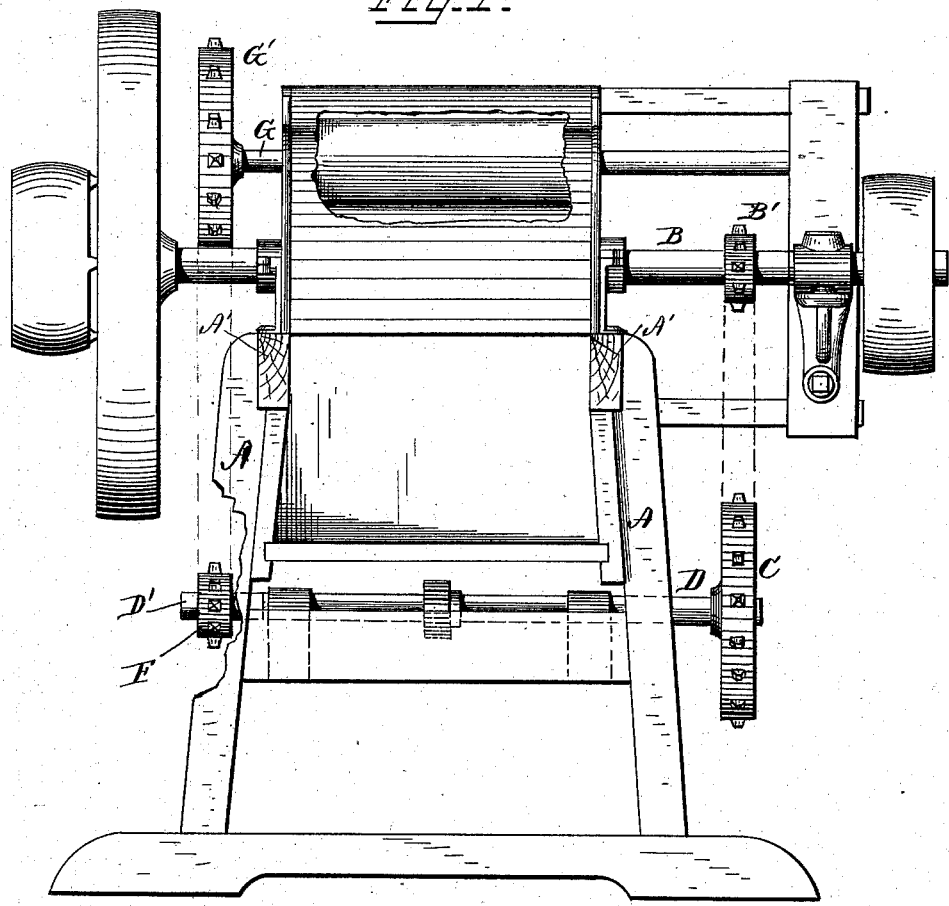
Figure 2:
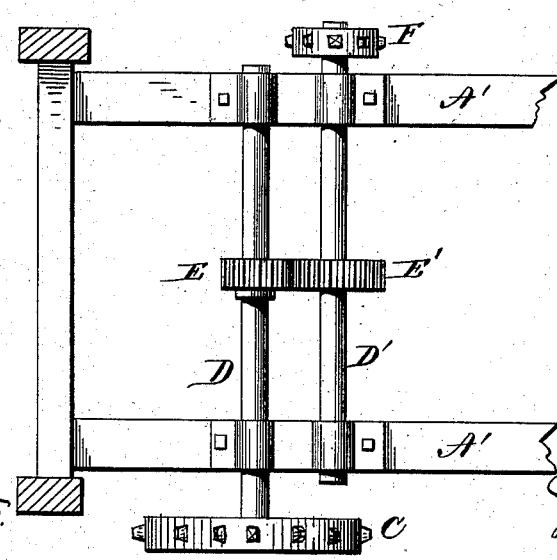

In the accompanying drawings, Figure 1 represents an end elevation of a cutting-machine embracing my improvement, taken from the delivery end. Fig. 2 represents a partial horizontal section taken below the plane of the cutting-cylinder and feed-rolls, and showing the geared parallel shafts referred to; and Fig. 3 is a perspective view of my improved machine with the hinged hood or cover raised to show the arrangement of parts.

A A' represent the main frame of the machine, made in any usual or preferred form, and provided in its upper part with suitable bearings for the main driving or cutter cylinder shaft B, to which motion is imparted in any usual or suitable manner, and also for the feed-roller shaft or shafts, one of which is represented at G. The shaft B is provided with a small band or sprocket wheel, B', from which motion is imparted by an endless band or chain to a large sprocket-wheel, C, fast on a transverse shaft, D, mounted in bearings on the lower longitudinal frame-timbers, A' A'.

D' is a second transverse shaft, also mounted in bearings on the frame-timbers A', and connected with and actuated from the shaft D by spur-gears E and E'—the former a small gear fast on and actuated by the shaft D, and the latter, of larger diameter, fast on and actuating the shaft D'. This second shaft, D', on the side of the machine opposite to that on which the wheel C on the shaft D is located, is armed with a small band or sprocket wheel, F, from which motion is communicated through a band or chain to a larger sprocket-wheel, G', on the end of one of the feed-roller shafts referred to. The gearing back by driving from small to large sprocket-wheels or gears is essential, in order to give to the feed-roller the slow movement required as compared with the cutter-shaft, and the interposed parallel shafts are essential in gearing back in the manner described, in order to avoid the crossing of a band for giving the desired direction of movement to the unyielding feed-roller shaft with which the connection described is made. The yielding feed-roller may be geared to and actuated from the shaft G in any usual or preferred manner.

The manner of gearing back to the feed-roller shaft from the first or main driving-shaft hereinabove described has been found exceedingly effective and desirable in practice, and serves to make the machine not only easy to operate, but almost noiseless in action, and at the same time the changing of the length of feed from short to long, and vice versa, can readily be made by removing the sprocket-wheel from the shaft D' and substituting a larger or smaller one therefor, as desired.

The spur-gears E and E' may be protected from foreign matter by any suitable form of covering.

In the machine represented an up-cut is employed. In a down-cut the positions of the yielding and unyielding feed-roller shafts will be reversed.

Having now described my invention, what I claim as new is—

The combination, with the driving and feed-roller shafts, of the interposed parallel shafts connected by the spur-gears E and E', and the sprocket-wheels and chains connecting the driving-shaft with the feed-roller shaft through said parallel shafts, arranged and operating substantially as described.

In testimony whereof I have hereunto set my hand this 16th day of February, A. D. 1883.

ELMORE W. ROSS.

Witnesses:
REX. SMITH,
EDW. W. DEKNIGHT.